US012798102B2

(12) United States Patent
Matsuno et al.

(10) Patent No.: US 12,798,102 B2
(45) Date of Patent: Nov. 17, 2026

(54) CALIBRATION APPARATUS AND CONVEYANCE ROBOT INCLUDING THE SAME

(71) Applicant: TOYOTA JIDOSHA KABUSHIKI KAISHA, Aichi-ken (JP)

(72) Inventors: Nobuyuki Matsuno, Tokyo-to (JP); Mamoru Uchiuda, Kawasaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 29 days.

(21) Appl. No.: 19/015,647

(22) Filed: Jan. 10, 2025

(65) Prior Publication Data

US 2025/0229430 A1 Jul. 17, 2025

(30) Foreign Application Priority Data

Jan. 15, 2024 (JP) ................................ 2024-003980

(51) Int. Cl.

| | |
|---|---|
| ***B25J 9/16*** | (2006.01) |
| ***B25J 5/00*** | (2006.01) |
| ***B65G 29/00*** | (2006.01) |
| ***B65G 41/00*** | (2006.01) |
| ***B65G 43/08*** | (2006.01) |

(52) U.S. Cl.

CPC ............ *B25J 9/1692* (2013.01); *B25J 5/007* (2013.01)

(58) Field of Classification Search

CPC ... B25J 9/1692; B25J 5/007; B25J 9/00; B25J 9/16; B25J 9/0003; B25J 9/161; B25J 9/162; B25J 9/1653; B25J 9/1694; B25J 9/1697; B25J 19/02; B25J 19/021; B65G 43/08; B65G 29/00; B65G 41/003; B65G 41/008; B65G 2201/02; B65G 2203/04; B65G 2203/042

See application file for complete search history.

(56) References Cited

U.S. PATENT DOCUMENTS

2017/0151670 A1* 6/2017 Huang .................. B25J 9/1692

FOREIGN PATENT DOCUMENTS

| | | |
|---|---|---|
| JP | H03-055179 A | 3/1991 |
| JP | 2006-242917 A | 9/2006 |
| WO | 2023/157151 A1 | 8/2023 |

* cited by examiner

*Primary Examiner* — Jonathan L Sample
*Assistant Examiner* — Byron Xavier Kasper
(74) *Attorney, Agent, or Firm* — HAUPTMAN HAM, LLP

(57) ABSTRACT

A calibration apparatus according to the present disclosure includes a setting unit configured to set a reference position of a first object to be driven in a housing in accordance with a state of detection of a first object to be detected by a first sensor, and a reference position of a second object to be driven in a housing in accordance with a state of detection of a second object to be detected by a second sensor, in which the setting unit determines a setting order of the respective reference positions of the first object to be driven and the second object to be driven based on respective operation statuses of the first object to be driven and the second object to be driven.

6 Claims, 8 Drawing Sheets

CALIBRATION APPARATUS AND CONVEYANCE ROBOT INCLUDING THE SAME

CROSS REFERENCE TO RELATED APPLICATIONS

This application is based upon and claims the benefit of priority from Japanese patent application No. 2024-003980, filed on Jan. 15, 2024, the disclosure of which is incorporated herein in its entirety by reference.

BACKGROUND

The present disclosure relates to a calibration apparatus and a conveyance robot including the same.

In general, in order to realize a highly accurate operation of an object to be driven by a motor or the like, it is required to accurately perform a calibration of the object to be driven. In other words, it is required to accurately set a reference position of an object to be driven. For example, Patent Literature 1 discloses an apparatus which detects, by electrical or optical means, that a diaphragm movable within a predetermined range along one direction is disposed at a reference position.

Patent Literature 1: Japanese Unexamined Patent Application Publication No. 2006-242917

SUMMARY

However, Patent Literature 1 does not disclose a method for detecting a reference position of each of a plurality of objects to be driven which are related to each other. Therefore, in the apparatus disclosed in Patent Literature 1, when an attempt is made to detect a reference position of one of the objects to be driven, there is a possibility that another object to be driven may interfere with the detection of the reference position of the one of the objects to be driven. That is, in the apparatus disclosed in Patent Literature 1, there is a problem that the respective calibrations of a plurality of objects to be driven which are related to each other cannot be quickly executed.

The present disclosure has been made in view of the aforementioned circumstances and an object thereof is to provide a calibration apparatus and a conveyance robot including the calibration apparatus by which it is possible to quickly execute respective calibrations of a plurality of objects to be driven which are related to each other.

A calibration apparatus according to the present disclosure includes: a first object to be detected installed in one of a first object to be driven and a housing, the first object to be driven being configured to be slidable or rotatable with respect to a first reference shaft and being attached to the housing; a first sensor configured to be able to detect the first object to be detected, the first sensor being installed in an other of the first object to be driven and the housing; a second object to be detected installed in one of a second object to be driven and the housing, the second object to be driven being configured to be slidable or rotatable with respect to a second reference shaft and being attached to the housing together with the first object to be driven; a second sensor configured to be able to detect the second object to be detected, the second sensor being installed in an other of the second object to be detected and the housing; and a setting unit configured to set a reference position of the first object to be driven in the housing in accordance with a state of detection of the first object to be detected by the first sensor, and a reference position of the second object to be driven in the housing in accordance with a state of detection of the second object to be detected by the second sensor, in which the setting unit determines a setting order of the respective reference positions of the first object to be driven and the second object to be driven based on respective operation statuses of the first object to be driven and the second object to be driven. The calibration apparatus can quickly set respective reference positions of a plurality of objects to be driven which are related to each other. That is, the calibration apparatus can quickly execute respective calibrations of a plurality of objects to be driven which are related to each other.

According to the present disclosure, it is possible to provide a calibration apparatus and a conveyance robot including the calibration apparatus by which it is possible to quickly execute respective calibrations of a plurality of objects to be driven which are related to each other.

The above and other objects, features and advantages of the present disclosure will become more fully understood from the detailed description given hereinbelow and the accompanying drawings.

DESCRIPTION OF EMBODIMENTS

Figure 1:
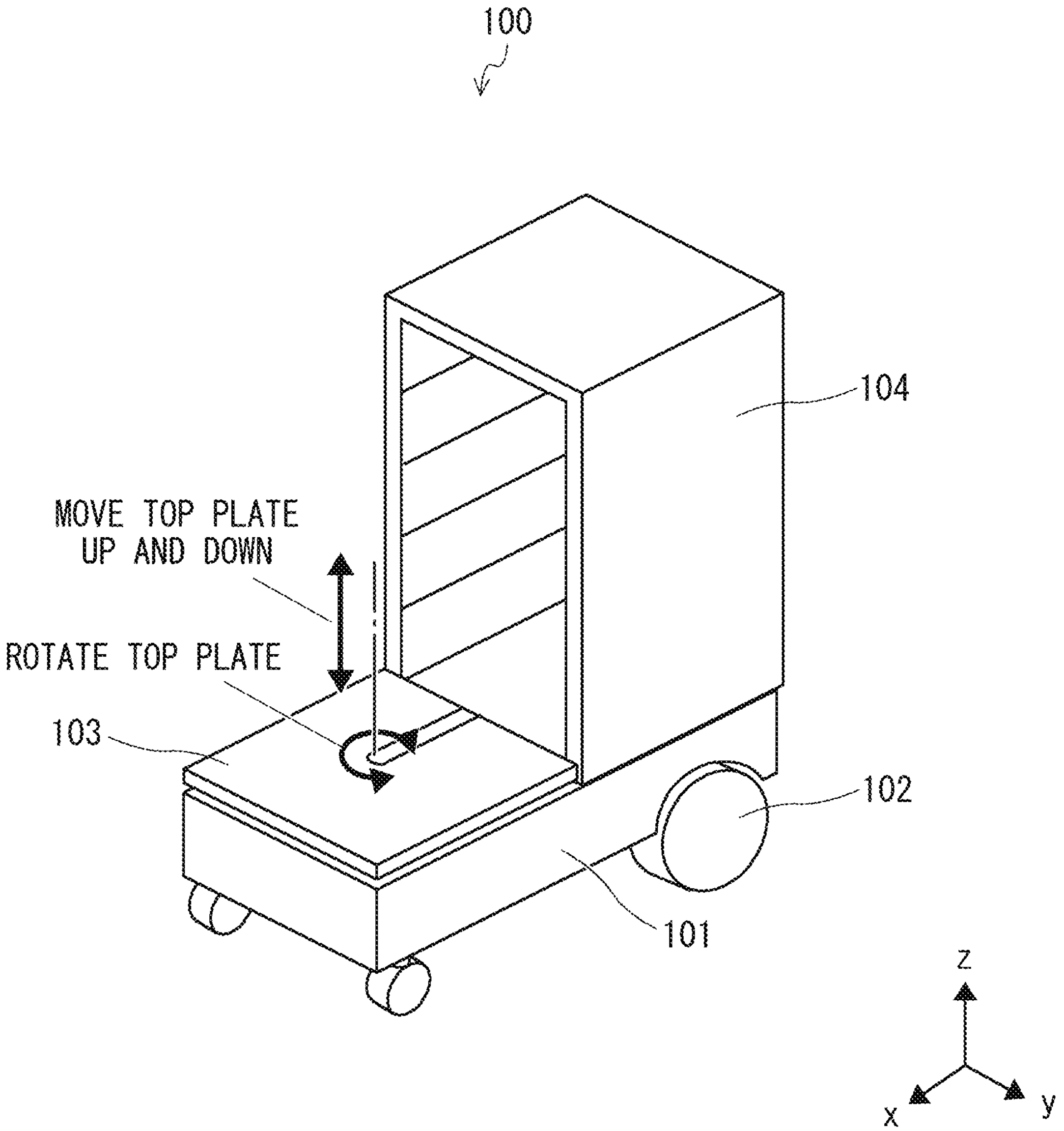
FIG. 1 is a schematic perspective view showing an external appearance of a conveyance robot to which a calibration apparatus according to a first embodiment is applied.

The present disclosure will be described hereinafter through embodiments of the present disclosure. However, the disclosure according to the claims is not limited to the following embodiments. Further, all the components/structures described in the embodiments are not necessarily essential as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

Figure 2:
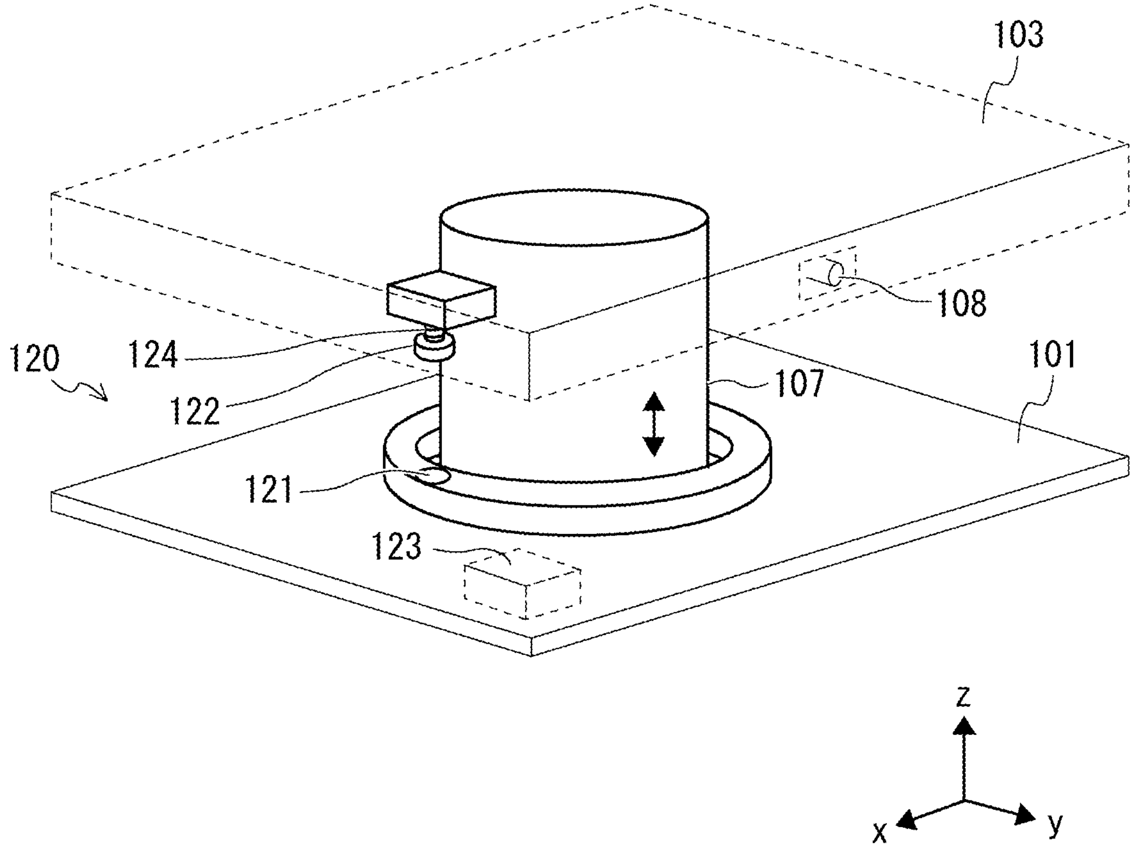
FIG. 2 is a schematic perspective view showing a part of the conveyance robot to which the calibration apparatus according to the first embodiment is applied.
Figure 3:
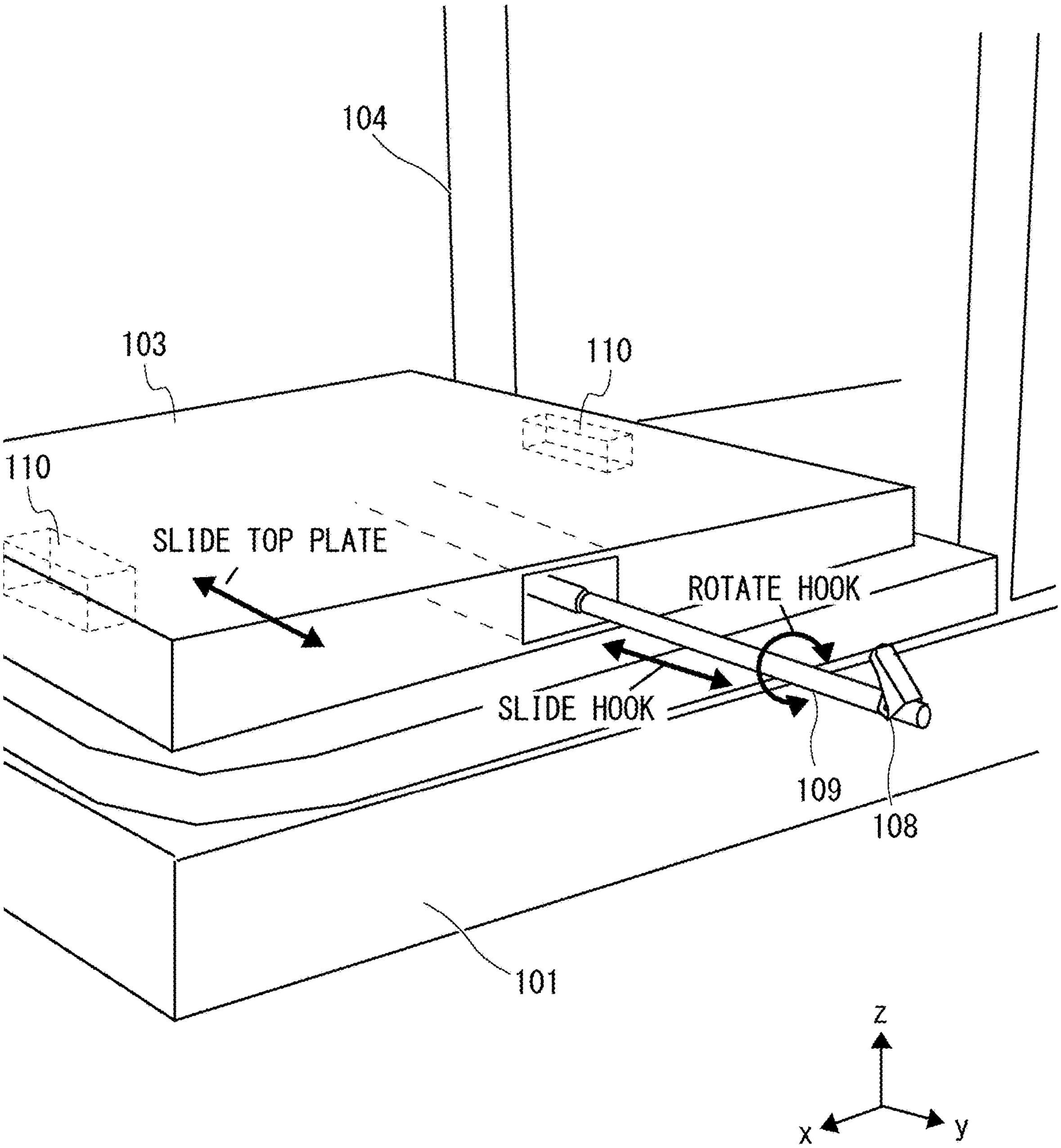
FIG. 3 is a schematic perspective view showing a part of the conveyance robot to which the calibration apparatus according to the first embodiment is applied.

FIG. 1 is a schematic perspective view showing an external appearance of a conveyance robot to which a calibration apparatus according to a first embodiment is applied. Each of FIGS. 2 and 3 is a schematic perspective view showing a part of the conveyance robot according to the first embodiment. The conveyance robot according to the present embodiment is an autonomous mobile robot that can automatically perform an operation of placing a tray disposed on a shelf or the like installed at a starting point on a top plate and convey it to a destination and then move the tray to a shelf or the like installed at the destination.

A conveyance robot 100 according to the present embodiment includes at least a housing 101, wheels 102, a top plate 103, a storage unit 104, and a calibration apparatus 120. In addition, the conveyance robot 100 includes, for each object to be driven, a motor (actuator) for driving the object to be driven, and an encoder for measuring angle information and the like of the motor.

The housing 101 supports the top plate 103 and the storage unit 104, and stores a battery, a motor for rotating the wheels 102, a control apparatus for controlling the operation of the conveyance robot 100, and the like.

The top plate 103 is supported by the housing 101 via a lifting shaft 107 whose axial direction is a vertical direction (z-axis direction). Note that the top plate 103 is configured to be slidable along the vertical direction by the expansion and contraction of the lifting shaft 107 along the vertical direction. That is, the top plate 103 is configured to be able to move up and down. The conveyance robot 100 is provided with a first motor and a first encoder for the expansion and contraction processing of the lifting shaft 107 in the vertical direction. The first motor drives the lifting shaft 107 to expand and contract it in the vertical direction. The first encoder measures angle information and the like of the first motor. The calibration apparatus 120 performs a calibration of the lifting shaft 107, which is an object to be driven of the first motor, in the vertical direction. In other words, the calibration apparatus 120 sets a reference position (initial position) of the lifting shaft 107 in the vertical direction. A method for performing a calibration of the lifting shaft 107 in the vertical direction by the calibration apparatus 120 will be described later.

The top plate 103 is configured to be rotatable along a horizontal plane (xy plane) using the lifting shaft 107 as a rotation shaft. The conveyance robot 100 is provided with a second motor and a second encoder for rotating the lifting shaft 107. The second motor drives the lifting shaft 107 to rotate it. The second encoder measures angle information and the like of the second motor. The calibration apparatus 120 performs a calibration of the lifting shaft 107, which is an object to be driven of the second motor, at the rotation angle. In other words, the calibration apparatus 120 sets a reference position of the lifting shaft 107 at the rotation angle. A method for performing a calibration of the lifting shaft 107 at the rotation angle by the calibration apparatus 120 will be described later.

Further, the top plate 103 is configured to be slidable along the horizontal direction by moving a linear motion shaft 110 for sliding the top plate 103 along the horizontal direction. The conveyance robot 100 is provided with a third motor and a third encoder for moving the linear motion shaft 110 in the horizontal direction. The third motor drives the linear motion shaft 110 to move it in the horizontal direction. The third encoder measures angle information and the like of the third motor. The calibration apparatus 120 performs, in the horizontal direction, a calibration of the slide linear motion shaft 110 for sliding the top plate 103, which is an object to be driven of the third motor. A method for performing a calibration of the linear motion shaft 110 in the horizontal direction by the calibration apparatus 120 will be described later.

The top plate 103 has a rectangular planar shape and is formed so that an object to be conveyed such as a tray can be placed thereon. An entrance/exit of a hook 108 is provided in one of the four side surfaces of the top plate 103. The hook 108 can project from the entrance/exit in a direction perpendicular to the side surface where the entrance/exit is located. By hooking an object to be conveyed onto the hook 108 and moving a linear motion shaft 109 to the tip of which the hook 108 is attached in the horizontal direction, the conveyance robot 100 can move the object to be conveyed which is hooked onto the hook 108 from the top plate 103 to the storage unit 104 or an external shelf, or from the storage unit 104 or an external shelf to the top plate 103. The conveyance robot 100 can also hook the hook 108 onto an object to be conveyed and detach the hook 108 from the object to be conveyed by rotating the hook 108 using the linear motion shaft 109 as a rotation shaft. In the following description, among the four sides of the top plate 103, the side thereof on which the entrance/exit of the hook 108 is provided is referred to as a delivery port of an object to be conveyed in the top plate 103.

The conveyance robot 100 is provided with a fourth motor and a fourth encoder for moving the linear motion shaft 109 in the horizontal direction. The fourth motor drives the linear motion shaft 109 to move it in the horizontal direction. The fourth encoder measures angle information and the like of the fourth motor. The calibration apparatus 120 performs a calibration of the linear motion shaft 109, which is an object to be driven of the fourth motor, in the horizontal direction. In other words, the calibration apparatus 120 sets a reference position of the linear motion shaft 109 in the horizontal direction. A method for performing a calibration of the linear motion shaft 109 in the horizontal direction by the calibration apparatus 120 will be described later.

The conveyance robot 100 is provided with a fifth motor and a fifth encoder for rotating the linear motion shaft 109. The fifth motor drives the linear motion shaft 109 to rotate it. The fifth encoder measures angle information and the like of the fifth motor. The calibration apparatus 120 performs a calibration of the linear motion shaft 109, which is an object to be driven of the fifth motor, at the rotation angle. In other words, the calibration apparatus 120 sets a reference position of the linear motion shaft 109 at the rotation angle. A method for performing a calibration of the linear motion shaft 109 at the rotation angle by the calibration apparatus 120 is similar to the method for performing a calibration of the lifting shaft 107 at the rotation angle by the calibration apparatus 120.

For example, when an object to be conveyed is transferred between the top plate 103 and an external shelf, the top plate 103 first moves up and down in accordance with the height of the external shelf. Then, the delivery port of the top plate 103 is directed to the external shelf by rotating the top plate 103. Then, the top plate 103 and the external shelf are connected by sliding the top plate 103 toward the external shelf. Then, the object to be conveyed is transferred between the top plate 103 and the external shelf by using the hook 108. After the object to be conveyed is transferred between the top plate 103 and the external shelf, the top plate 103 returns to the original position, for example, by performing the processes performed before the object to be conveyed is transferred between the top plate 103 and the external shelf in the reverse order.

Further, when the object to be conveyed is transferred between the top plate 103 and the storage unit 104, the top plate 103 first moves up and down in accordance with the height of the storage unit 104. Then, the delivery port of the top plate 103 is directed to the storage unit 104 by rotating the top plate 103. Then, the top plate 103 and the storage unit 104 are connected by sliding the top plate 103 toward the storage unit 104. Then, the object to be conveyed is transferred between the top plate 103 and the storage unit 104 by using the hook 108. After the object to be conveyed is transferred between the top plate 103 and the storage unit 104, the top plate 103 returns to the original position, for example, by performing the processes performed before the object to be conveyed is transferred between the top plate 103 and the storage unit 104 in the reverse order.

In the first to the fifth encoders, when the power supply of the conveyance robot 100 is shut down, the storage of the measured angle information becomes indefinite. Therefore, when the power is turned on, the conveyance robot 100 needs to perform calibrations (set reference positions) of the objects to be driven by the first to the fifth motors. Therefore, the calibration apparatus 120 performs a calibration of each of the objects to be driven when the power is turned on. Note that the calibration apparatus 120 may perform a calibration of each of the objects to be driven as needed during operation, not only when the power is turned on.

Figure 4:
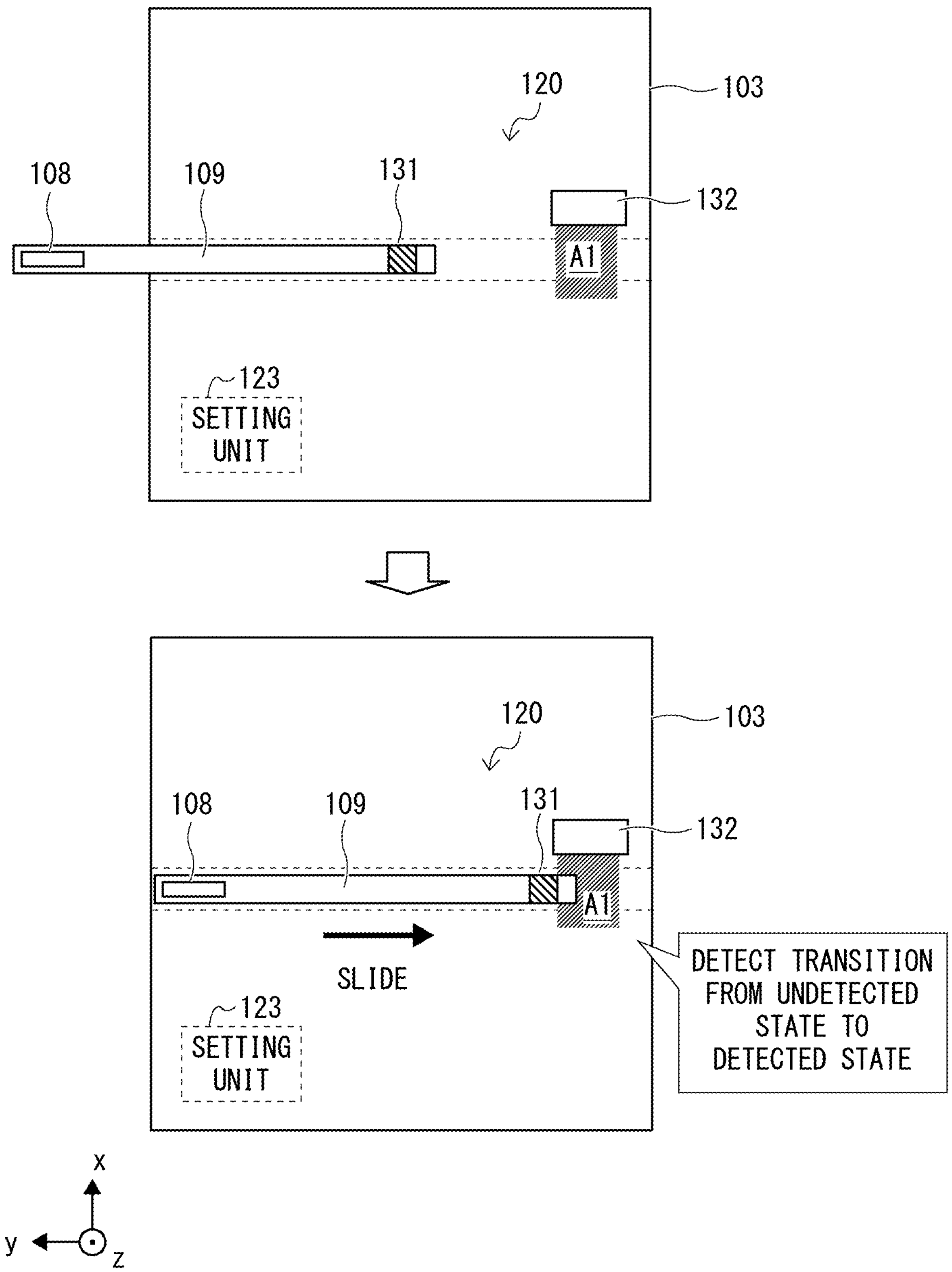
FIG. 4 is a schematic plan view for explaining an example of a calibration performed by the calibration apparatus according to the first embodiment.
Figure 5:
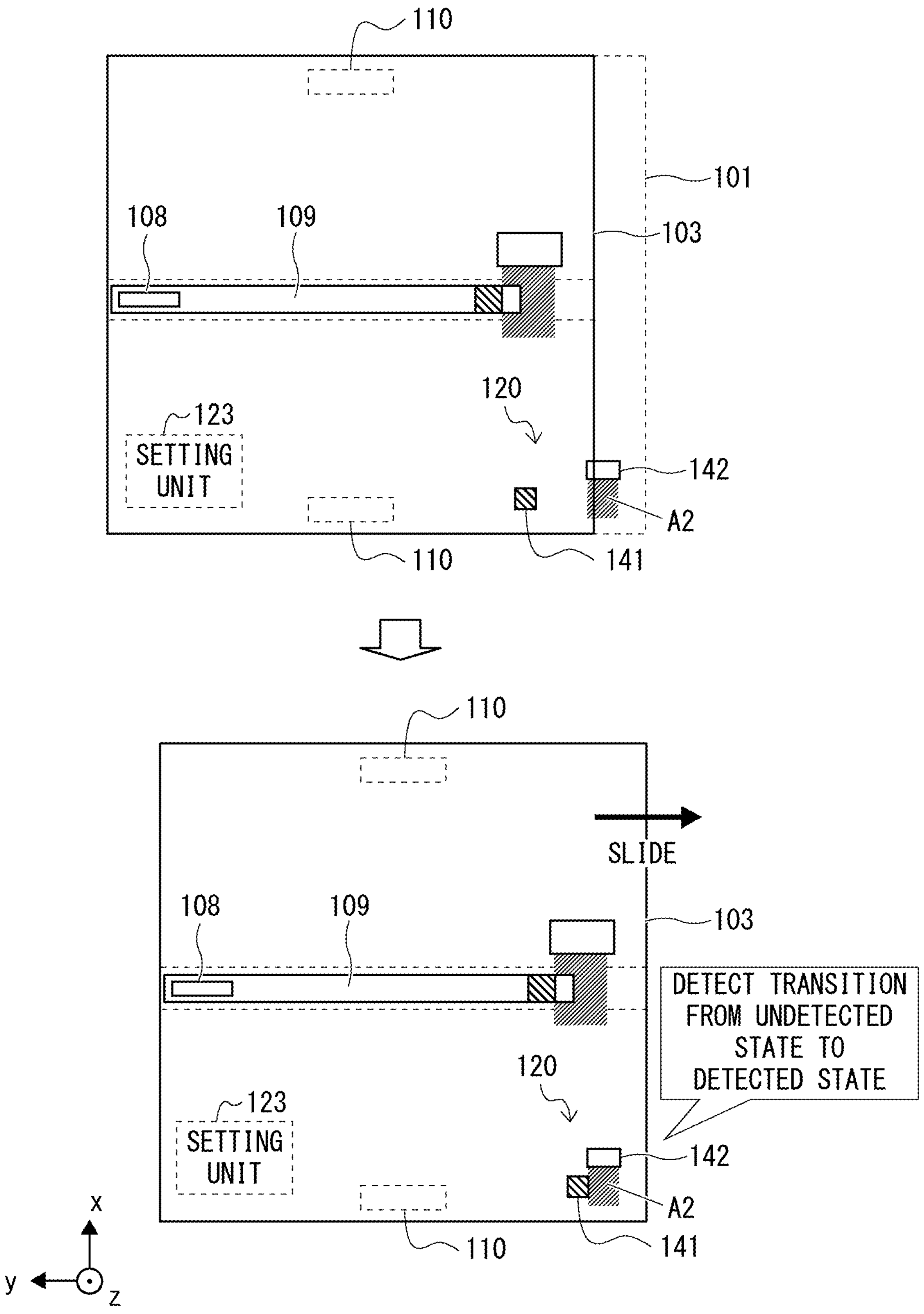
FIG. 5 is a schematic plan view for explaining an example of a calibration performed by the calibration apparatus according to the first embodiment.
Figure 6:
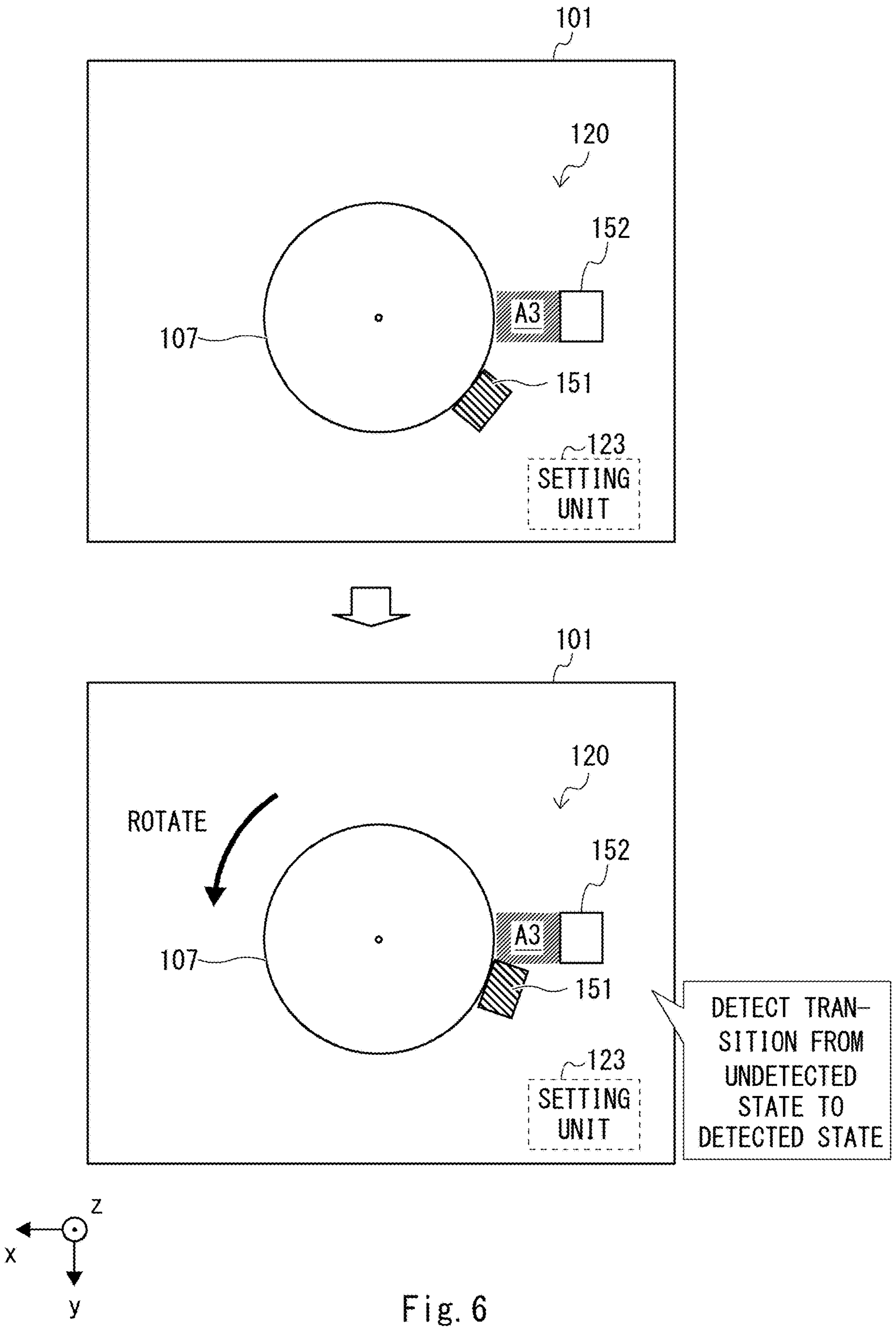
FIG. 6 is a schematic plan view for explaining an example of a calibration performed by the calibration apparatus according to the first embodiment.

A method for performing a calibration of each object to be driven by the calibration apparatus 120 will be described below with reference to FIGS. 2 and 4 to 6. Each of FIGS. 4 to 6 is a schematic plan views for explaining an example of a calibration performed by the calibration apparatus 120.

First, an example of a case in which the calibration apparatus 120 performs a calibration of the linear motion shaft 109, which is an object to be driven and to the tip of which the hook 108 is attached, in the horizontal direction will be described with reference to FIG. 4. FIG. 4 shows a part of the top plate 103, the hook 108, the linear motion shaft 109, and the calibration apparatus 120. FIG. 4 also shows an object 131 to be detected, a sensor 132, and a setting unit 123 as a part of the calibration apparatus 120.

The object 131 to be detected, for example, has a specific shape, pattern, or color, and is attached to the rear end of the linear motion shaft 109. The sensor 132 is, for example, a photo reflector, and is attached to the top plate 103 (on the housing side). The sensor 132 is configured to be able to detect the object 131 to be detected that is positioned in a detection range A1. Note that the attachment positions of the sensor 132 and the object 131 to be detected may be reversed.

For example, in the calibration apparatus 120, the setting unit 123 uses a motor to slide the linear motion shaft 109, which is a calibration target, at a speed v1 in the direction in which the hook 108 is accommodated in the top plate 103 (the y-axis negative direction). Then, the setting unit 123 sets the position of the linear motion shaft 109 at the timing when the sensor 132 detects the transition of the object 131 to be detected from an undetected state to a detected state as a reference position. Note that the setting unit 123 may slide the linear motion shaft 109 in the reverse direction (the y-axis positive direction) and set the position of the linear motion shaft 109 at the timing when the sensor 132 detects the transition of the object 131 to be detected from a detected state to an undetected state as a reference position.

Alternatively, when the object 131 to be detected has come inside the detection range A1 of the sensor 132 due to a delay in the timing at which the sensor 132 detects the transition of the object 131 to be detected from an undetected state to a detected state, the setting unit 123 may slide the linear motion shaft 109 in the reverse direction (the y-axis positive direction) at a speed v2 slower than the speed v1 and set the position of the linear motion shaft 109 at the timing when the sensor 132 detects the transition of the object 131 to be detected from a detected state to an undetected state as a reference position. Note that since the speed v2 is slower than the speed v1, the deviation of the timing when the sensor 132 detects the transition of the object 131 to be detected from a detected state to an undetected state is small. Therefore, the calibration apparatus 120 can accurately and quickly set a reference position of the linear motion shaft 109, which is a calibration target, in the horizontal direction. That is, the calibration apparatus 120 can accurately and quickly execute a calibration of the linear motion shaft 109 in the horizontal direction.

Next, an example in which the calibration apparatus 120 performs, in the horizontal direction, a calibration of the linear motion shaft 110 for sliding the top plate 103, which is an object to be driven, will be described with reference to FIG. 5. FIG. 5 shows a part of the housing 101, the top plate 103, the hook 108, the linear motion shaft 109, and the calibration apparatus 120. FIG. 5 also shows an object 141 to be detected, a sensor 142, and the setting unit 123 as a part of the calibration apparatus 120.

The object 141 to be detected has, for example, a specific shape, pattern, or color, and is attached to the top plate 103 moving together with the linear motion shaft 110. The sensor 142 is, for example, a photo reflector, and is attached to the housing 101. The sensor 142 is configured to be able to detect the object 141 to be detected that is positioned in a detection range A2. Note that the attachment positions of the sensor 142 and the object 141 to be detected may be reversed.

For example, in the calibration apparatus 120, the setting unit 123 uses a motor to slide the linear motion shaft 110, which is a calibration target, at the speed v1 in the direction in which the top plate 103 is accommodated on the housing 101 side (the y-axis negative direction). Then, the setting unit 123 sets the position of the linear motion shaft 110 at the timing when the sensor 142 detects the transition of the object 141 to be detected from an undetected state to a detected state as a reference position. Note that the setting unit 123 may slide the linear motion shaft 110 in the reverse direction (the y-axis positive direction) and set the position of the linear motion shaft 110 at the timing when the sensor 142 detects the transition of the object 141 to be detected from a detected state to an undetected state as a reference position.

Alternatively, when the object 141 to be detected has come inside the detection range A2 of the sensor 142 due to a delay in the timing at which the sensor 142 detects the transition of the object 141 to be detected from an undetected state to a detected state, the setting unit 123 may slide the linear motion shaft 110 in the reverse direction (the y-axis positive direction) at the speed v2 slower than the speed v1 and set the position of the linear motion shaft 110 at the timing when the sensor 142 detects the transition of the object 141 to be detected from a detected state to an undetected state as a reference position. Note that since the speed v2 is slower than the speed v1, the deviation of the timing when the sensor 142 detects the transition of the object 141 to be detected from a detected state to an undetected state is small. Therefore, the calibration apparatus 120 can accurately and quickly set a reference position of the linear motion shaft 110, which is a calibration target, in the horizontal direction. That is, the calibration apparatus 120 can accurately and quickly execute a calibration of the linear motion shaft 110 in the horizontal direction.

Next, an example in which the calibration apparatus 120 performs a calibration of the lifting shaft 107, which is an object to be driven and which moves the top plate 103 up and down, in the vertical direction will be described with reference to FIG. 2. FIG. 2 shows an object 121 to be detected, a sensor 122, the setting unit 123, and a spring 124 as a part of the calibration apparatus 120.

The object 121 to be detected is a mechanical stopper attached to the housing 101. The sensor 122 is a pressure-sensitive sensor that detects whether or not it comes into contact with the mechanical stopper, and is attached to the lifting shaft 107. Further, the sensor 122 is provided with the spring 124 that absorbs an impact when the sensor 122 comes into contact with the mechanical stopper. Note that the attachment positions of the sensor 122 and the object 121 to be detected may be reversed.

The calibration of the lifting shaft 107 performed by the calibration apparatus 120 in the vertical direction is basically the same as the calibration of the linear motion shaft 109 performed by the calibration apparatus 120 in the horizontal direction.

Specifically, in the calibration apparatus 120, the setting unit 123 uses a motor to slide the lifting shaft 107, which is a calibration target, at the speed v1 in the direction in which the top plate 103 is moved down (the z-axis negative direction). Then, the setting unit 123 sets the position of the lifting shaft 107 at the timing when the sensor 122 detects the transition of the object 121 to be detected from an undetected state to a detected state as a reference position. Note that the setting unit 123 may slide the lifting shaft 107 in the reverse direction (the z-axis positive direction) and set the position of the lifting shaft 107 at the timing when the sensor 122 detects the transition of the object 121 to be detected from a detected state to an undetected state as a reference position.

Alternatively, when the lifting shaft 107 has been moved down by the spring 124 absorbing an impact even after the sensor 122 has come into contact with the object 121 to be detected due to a delay in the timing at which the sensor 122 detects the transition of the object 121 to be detected from an undetected state to a detected state, the setting unit 123 may slide the lifting shaft 107 in the reverse direction (the z-axis positive direction) at the speed v2 slower than the speed v1 and set the position of the lifting shaft 107 at the timing when the sensor 122 detects the transition of the object 121 to be detected from a detected state to an undetected state as a reference position. Note that since the speed v2 is slower than the speed v1, the deviation of the timing when the sensor 122 detects the transition of the object 121 to be detected from a detected state to an undetected state is small. Therefore, the calibration apparatus 120 can accurately and quickly set a reference position of the lifting shaft 107, which is a calibration target, in the vertical direction. That is, the calibration apparatus 120 can accurately and quickly execute a calibration of the lifting shaft 107 in the vertical direction.

Next, an example in which the calibration apparatus 120 performs a calibration of the lifting shaft 107, which is an object to be driven, at the rotation angle will be described with reference to FIG. 6. FIG. 6 shows a part of the housing 101, the lifting shaft 107, and the calibration apparatus 120. FIG. 6 also shows an object 151 to be detected, a sensor 152, and the setting unit 123 as a part of the calibration apparatus 120. The object 151 to be detected is attached to the lifting shaft 107. The sensor 152 is, for example, a photo reflector, and is attached to the housing 101. The sensor 152 is configured to be able to detect the object 151 to be detected that is positioned in a detection range A3. Note that the attachment positions of the sensor 152 and the object 151 to be detected may be reversed.

First, in the calibration apparatus 120, the setting unit 123 uses a motor to rotate the lifting shaft 107, which is a calibration target, leftward at the speed v1. Then, the setting unit 123 sets the position of the lifting shaft 107 at the timing when the sensor 152 detects the transition of the object 151 to be detected from an undetected state to a detected state as a reference position. Note that the setting unit 123 may rotate the lifting shaft 107 in the reverse direction (rotate it rightward) and set the position of the lifting shaft 107 as a reference position at the timing when the sensor 152 detects the transition of the object 151 to be detected from a detected state to an undetected state as a reference position.

Alternatively, when the object 151 to be detected has come inside the detection range A2 of the sensor 152 due to a delay in the timing at which the sensor 152 detects the transition of the object 151 to be detected from an undetected state to a detected state, the setting unit 123 may rotate the lifting shaft 107 in the reverse direction (rotate it rightward) at the speed v2 slower than the speed v1 and set the position of the lifting shaft 107 at the timing when the sensor 152 detects the transition of the object 151 to be detected from a detected state to an undetected state as a reference position. Note that since the speed v2 is slower than the speed v1, the deviation of the timing when the sensor 152 detects the transition of the object 151 to be detected from a detected state to an undetected state is small. Therefore, the calibration apparatus 120 can accurately and quickly set a reference position of the lifting shaft 107, which is a calibration target, at the rotation angle. That is, the calibration apparatus 120 can accurately and quickly execute a calibration of the lifting shaft 107 at the rotation angle.

Incidentally, in a conveyance robot including a plurality of objects to be driven which operate in relation to each other, when an attempt is made to execute a calibration of any one of the objects to be driven, there is a possibility that the calibration of any one of the object to be driven cannot be executed since another object to be driven may interfere with it. Therefore, in the calibration apparatus 120, the setting unit 123 determines an order in which calibrations of a plurality of respective objects to be driven, which operate in relation to each other, are performed based on operation statuses of the plurality of objects to be driven. Note that operation status of each of the objects to be driven is determined based on a control state by a control apparatus. A specific description will be made below with reference to FIGS. 7 and 8.

Figure 7:
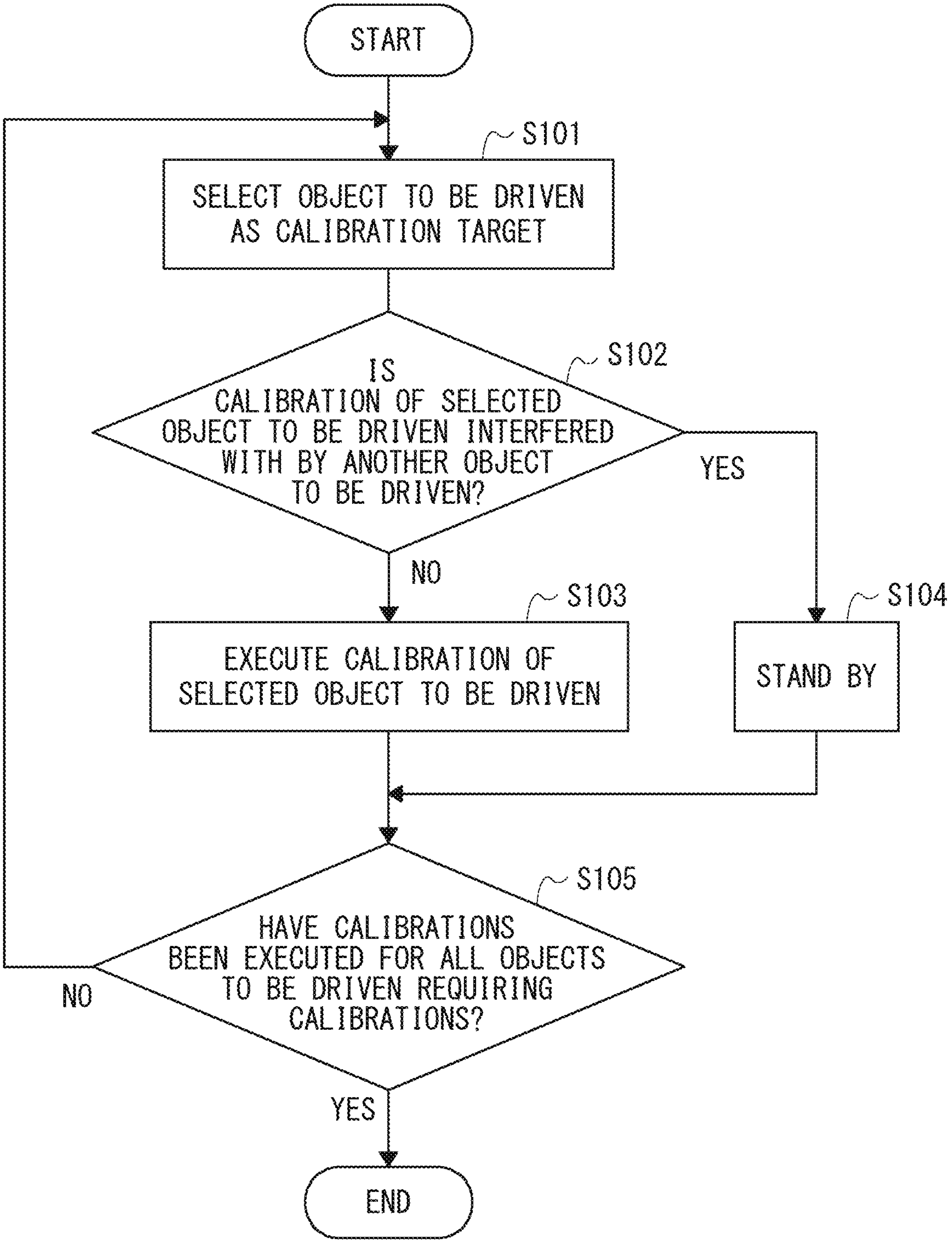
FIG. 7 is a flowchart showing operations performed by the calibration apparatus according to the first embodiment.
Figure 8:
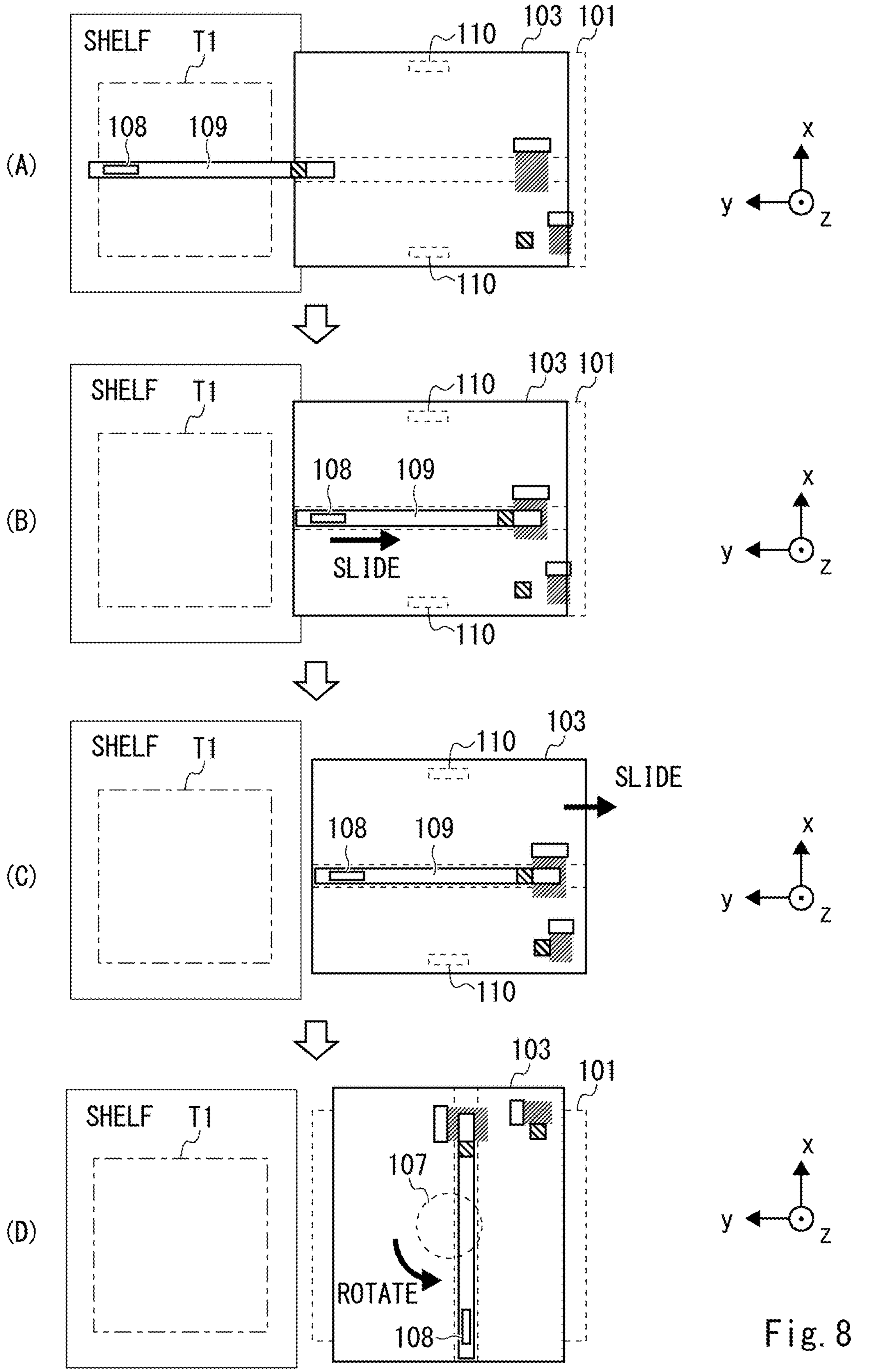
FIG. 8 is a schematic plan view for explaining an example of the operations performed by the calibration apparatus according to the first embodiment.

FIG. 7 is a flowchart showing operations performed by the calibration apparatus 120. FIG. 8 is a schematic plan view for explaining an example of the operations performed by the calibration apparatus 120. Processing proceeds in the order of (A), (B), (C), and (D) in FIG. 8. Note that a description will be given below of an example of a case in which the linear motion shaft 109 that slides the hook 108 in the horizontal direction, the linear motion shaft 110 that slides the top plate 103 in the horizontal direction, and the lifting shaft 107 that rotates the top plate 103 are calibration targets. Further, a description will be given below of an example of a case in which the calibration apparatus 120 starts execution of a calibration in a state in which the conveyance robot has moved an object T1 to be conveyed from the top plate 103 to an external shelf. Therefore, at the time of the start of the calibration, the hook 108 projects from the top plate 103 to the shelf side, and the top plate 103 and the external shelf are connected.

First, the calibration apparatus 120 selects an object to be driven, which is a calibration target, from among a plurality of object to be driven (Step S101). For example, the calibration apparatus 120 selects the linear motion shaft 110 that slides the top plate 103 in the horizontal direction as a calibration target.

Then, the calibration apparatus 120 determines whether or not the calibration of the selected linear motion shaft 110 is interfered with by another object to be driven related to the linear motion shaft 110 (Step S102). Note that the operation status (i.e., whether or not one object to be driven is interfered with by another object to be driven) of each of the objects to be driven is determined based on a control state by a control apparatus etc.

Referring to (A) in FIG. 8, since the linear motion shaft 109 that slides the hook 108 in the horizontal direction is projecting from the top plate 103, when an attempt is made to execute a calibration of the linear motion shaft 110 that slides the top plate 103 in the horizontal direction, the hook 108 may swing and unintentionally come into contact with the object T1 to be conveyed. That is, the calibration of the linear motion shaft 110 is interfered with by the linear motion shaft 109 (YES in Step S102). Therefore, the calibration apparatus 120 makes the execution of the calibration of the selected linear motion shaft 110 stand by (Step S104).

Then, the calibration apparatus 120 selects an object to be driven, for which a calibration has not been executed, as a calibration target in a state in which the execution of the calibration of the linear motion shaft 110 is made to stand by (NO in Step S105→Step S101). For example, the calibration apparatus 120 selects the linear motion shaft 109 that slides the hook 108 in the horizontal direction as a calibration target.

Then, the calibration apparatus 120 determines whether or not the calibration of the selected linear motion shaft 109 is interfered with by another object to be driven related to the linear motion shaft 109 (Step S102).

Referring to (A) in FIG. 8, even when the calibration of the linear motion shaft 109 is executed, it is not interfered with by another object to be driven related to the linear motion shaft 109 (NO in Step S102). Therefore, the calibration apparatus 120 executes the calibration of the selected linear motion shaft 109 (Step S103). More specifically, as shown in (B) in FIG. 8, the calibration apparatus 120 executes the calibration of the selected linear motion shaft 109 by sliding it in the direction in which the hook 108 is accommodated in the top plate 103.

Then, the calibration apparatus 120 selects an object to be driven, for which a calibration has not been executed, as a calibration target (NO in Step S105→Step S101).

For example, the calibration apparatus 120 selects the lifting shaft 107 that rotates the top plate 103 as a calibration target. However, in this case, as shown in (B) in FIG. 8, since the top plate 103 and the external shelf are connected, the calibration of the lifting shaft 107 that rotates the top plate 103 cannot be executed. That is, the calibration of the lifting shaft 107 is interfered with by the linear motion shaft 110 that slides the top plate 103 in the horizontal direction (YES in Step S102). Therefore, in this case, the calibration apparatus 120 makes execution of the calibration of the selected lifting shaft 107 stand by (Step S104).

Then, the calibration apparatus 120 selects an object to be driven, for which a calibration has not been executed, as a calibration target in a state in which the execution of the calibration of the lifting shaft 107 is made to stand by (NO in Step S105→Step S101). For example, the calibration apparatus 120 selects the linear motion shaft 110 in a standby state as a calibration target. Note that the calibration apparatus 120 may select the linear motion shaft 110 in a standby state as a calibration target without selecting the lifting shaft 107 after the selection of the linear motion shaft 109.

Referring to (B) in FIG. 8, since the hook 108 has already been accommodated in the top plate 103, even when the calibration of the linear motion shaft 110 that slides the top plate 103 in the horizontal direction is executed, the hook 108 does not swing and unintentionally come into contact with the object T1 to be conveyed. That is, the calibration of the linear motion shaft 110 is not interfered with by another object to be driven including the linear motion shaft 109 that slides the hook 108 in the horizontal direction (NO in Step S102). Therefore, the calibration apparatus 120 executes the calibration of the selected linear motion shaft 110 (Step S103). Specifically, as shown in (C) in FIG. 8, the calibration apparatus 120 executes the calibration of the selected linear motion shaft 110 by sliding it in the direction in which the top plate 103 is accommodated on the housing 101 side.

Then, the calibration apparatus 120 selects the lifting shaft 107, which is an object to be driven and for which a calibration has not been executed, as a calibration target (NO in Step S105→Step S101).

Referring to (C) in FIG. 8, since the top plate 103 has already been accommodated on the housing 101 side and the top plate 103 is not connected to an external shelf, there is no problem even when the calibration of the lifting shaft 107 that rotates the top plate 103 is executed. That is, the calibration of the lifting shaft 107 is not interfered with by another object to be driven including the linear motion shaft 110 that slides the top plate 103 in the horizontal direction (NO in Step S102). Therefore, the calibration apparatus 120 executes the calibration of the selected lifting shaft 107 (Step S103). More specifically, as shown in (D) in FIG. 8, the calibration apparatus 120 executes the calibration of the selected lifting shaft 107 by rotating it in the direction in which the top plate 103 is rotated, for example, leftward.

Then, when there is no object to be driven for which a calibration has not been executed (YES in Step S105), the calibration apparatus 120 ends the execution of the calibration.

In addition to this, for example, when an object to be conveyed is disposed in the top plate 103, the calibration apparatus 120 may makes execution of the calibration of each of the objects to be driven, and may execute the calibration of each of the objects to be driven after the object to be conveyed is moved from the top plate 103 to an external shelf or the storage unit 104.

In this way, the calibration apparatus according to the present disclosure determines an order in which calibrations of a plurality of respective objects to be driven related to each other are performed based on operation statuses of the plurality of objects to be driven. Thus, the calibration apparatus according to the present disclosure can quickly set respective reference positions of a plurality of objects to be driven which are related to each other. That is, the calibration apparatus according to the present disclosure can quickly execute respective calibrations of a plurality of objects to be driven which are related to each other.

The present disclosure is not limited to the above-described embodiments and may be changed as appropriate without departing from the scope and spirit of the present disclosure. For example, the calibration apparatus according to the present disclosure is not limited to being applied to a conveyance robot, but may be applied to any apparatus or system that requires a calibration.

Further, in the present disclosure, it is possible to implement some or all of the control processes performed in the calibration apparatus 120 by causing a Central Processing Unit (CPU) to execute a computer program.

The above-described program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A calibration apparatus comprising:

a first object to be detected installed in one of a first object to be driven and a housing, the first object to be driven being configured to be slidable and rotatable with respect to a first reference shaft and being attached to the housing;

a first sensor configured to be able to detect the first object to be detected, the first sensor being installed in an other of the first object to be driven and the housing;

a second object to be detected installed in one of a second object to be driven and the housing, the second object to be driven being configured to be slidable and rotatable with respect to a second reference shaft and being attached to the housing together with the first object to be driven;

a second sensor configured to be able to detect the second object to be detected, the second sensor being installed in an other of the second object to be detected and the housing; and a processor configured to set a reference position of the first object to be driven in the housing in accordance with a state of detection of the first object to be detected by the first sensor, and a reference position of the second object to be driven in the housing in accordance with a state of detection of the second object to be detected by the second sensor, wherein the processor is configured to determine a setting order of the respective reference positions of the first object to be driven and the second object to be driven based on respective operation statuses with respect to an occurrence of an interference of the first object to be driven with the second object to be driven.

2. The calibration apparatus according to claim 1, wherein when the processor determines that the interference will occur and it is not possible to slide or rotate the second object to be driven by a predetermined operation of the first object to be driven, the processor is configured to set the reference position of the second object to be driven after the predetermined operation of the first object to be driven is completed.

3. The calibration apparatus according to claim 1, further comprising:

a third object to be detected installed in one of a third object to be driven and the housing, the third object to be driven being configured to be slidable and rotatable with respect to a third reference shaft and being attached to the housing together with the first and the second objects to be driven; and a third sensor configured to be able to detect the third object to be detected, the third sensor being installed in an other of the third object to be driven and the housing, wherein the processor further configured to set a reference position of the third object to be driven in the housing in accordance with a state of detection of the third object to be detected by the third sensor, and further determines a setting order of the respective reference positions of the first to the third objects to be driven based on respective operation statuses of the first to the third objects to be driven.

4. The calibration apparatus according to claim 3, wherein when the processor determines that it is not possible to slide or rotate the third object to be driven by a predetermined operation of at least one of the first object to be driven and the second object to be driven, the processor is configured to set the reference position of the third object to be driven after the predetermined operation of at least one of the first object to be driven and the second object to be driven is completed.

5. The calibration apparatus according to claim 1, wherein when there is no object to be driven for which a calibration has not been executed, the calibration apparatus is configured to end execution of the calibration.

6. A conveyance robot, comprising:

a calibration apparatus comprising:

a first object to be detected installed in one of a first object to be driven and a housing, the first object to be driven being configured to be slidable and rotatable with respect to a first reference shaft and being attached to the housing;

a first sensor configured to be able to detect the first object to be detected, the first sensor being installed in an other of the first object to be driven and the housing;

a second object to be detected installed in one of a second object to be driven and the housing, the second object to be driven being configured to be slidable and rotatable with respect to a second reference shaft and being attached to the housing together with the first object to be driven;

a second sensor configured to be able to detect the second object to be detected, the second sensor being installed in an other of the second object to be detected and the housing; and a processor configured to set a reference position of the first object to be driven in the housing in accordance with a state of detection of the first object to be detected by the first sensor, and a reference position of the second object to be driven in the housing in accordance with a state of detection of the second object to be detected by the second sensor, wherein the processor is configured to determine a setting order of the respective reference positions of the first object to be driven and the second object to be driven based on respective operation statuses with respect to an occurrence of an interference of the first object to be driven with the second object to be driven, the first and second objects to be driven; and the housing.

* * * * *